United States Patent
Niskanen et al.

(10) Patent No.: US 8,103,058 B2
(45) Date of Patent: Jan. 24, 2012

(54) DETECTING AND TRACKING OBJECTS IN DIGITAL IMAGES

(75) Inventors: Matti Niskanen, Oulu (FI); Markus Turtinen, Ii (FI); Jari Hannuksela, Ii (FI)

(73) Assignee: Visidon Oy, Oulu (FI)

( * ) Notice: Subject to any disclaimer, the term of this patent is extended or adjusted under 35 U.S.C. 154(b) by 0 days.

(21) Appl. No.: 13/124,409

(22) PCT Filed: Oct. 15, 2009

(86) PCT No.: PCT/FI2009/050832
§ 371 (c)(1),
(2), (4) Date: Jun. 14, 2011

(87) PCT Pub. No.: WO2010/043771
PCT Pub. Date: Apr. 22, 2010

(65) Prior Publication Data
US 2011/0268319 A1    Nov. 3, 2011

(30) Foreign Application Priority Data

Oct. 17, 2008   (FI) .................................. 20085986

(51) Int. Cl.
*G06K 9/00* (2006.01)
(52) U.S. Cl. ...................... 382/103; 348/169; 706/20
(58) Field of Classification Search .............. 382/100, 382/103, 115, 117, 118, 170, 173, 181, 190, 382/195, 206, 209; 348/169–172, 208.14; 706/20
See application file for complete search history.

(56) References Cited

U.S. PATENT DOCUMENTS

| 4,977,603 A | * | 12/1990 | Irie et al. ..................... 382/218 |
| 5,020,121 A | * | 5/1991 | Rosenberg .................... 382/238 |
| 7,110,607 B2 | * | 9/2006 | Fujimoto et al. ............. 382/237 |
| 7,702,136 B2 | * | 4/2010 | Steinberg et al. ............. 382/118 |
| 2005/0220336 A1 | | 10/2005 | Sabe et al. |

(Continued)

FOREIGN PATENT DOCUMENTS

| JP | 11-250247 A | 9/1999 |
| WO | WO 2008/107002 A1 | 9/2008 |

OTHER PUBLICATIONS

Ahonen et al., "Face Description with Local Binary Patterns: Application to Face Reognition," IEEE Transactions on Pattern Analysis and Machine Intelligence, vol. 28, No. 12, Dec. 2006, pp. 2037-2041. (Published online Oct. 12, 2006).

(Continued)

*Primary Examiner* — Anand Bhatnagar
(74) *Attorney, Agent, or Firm* — Birch, Stewart, Kolasch & Birch, LLP (57) ABSTRACT

There is provided an improved solution for detecting and tracking objects in digital images. The solution comprises selecting a neighborhood for each pixel under observation, the neighborhood being of known size and form, and reading pixel values of the neighborhood. Further the solution comprises selecting at least one set of coefficients for weighting each neighborhood such that each pixel value of each neighborhood is weighted with at least one coefficient; searching for an existence of at least one object feature at each pixel under observation on the basis of a combination of weighted pixel values at each neighborhood; and verifying the existence of the object in the digital image on the basis of the searches of existence of at least one object feature at a predetermined number of pixels.

11 Claims, 3 Drawing Sheets

U.S. PATENT DOCUMENTS

| | | | |
|---|---|---|---|
| 2007/0172099 A1 | 7/2007 | Park et al. | |
| 2008/0166026 A1* | 7/2008 | Huang et al. | 382/118 |
| 2008/0175447 A1* | 7/2008 | Kim et al. | 382/118 |
| 2009/0074259 A1* | 3/2009 | Baltatu et al. | 382/118 |
| 2011/0007983 A1* | 1/2011 | Cho et al. | 382/260 |
| 2011/0091113 A1* | 4/2011 | Ito et al. | 382/197 |
| 2011/0210851 A1* | 9/2011 | Woodfill et al. | 340/540 |

OTHER PUBLICATIONS

Kublbeck et al., "Face Detection and Tracking in Video Sequences Using the Modified Census Transformation," Image and Vision Computing, vol. 24, 2006, pp. 564-572.

Laaksonen et al., "Digitaalinen Kuvankasittely, Kussimoniste," TKK 2004, Luku 18, Kuvien segmentointi, pp. 34-38.

Ojansivu et al., "Blur Insensitive Texture Classification Using Local Phase Quantization," International Conference on Image and Signal Processing 2008, LNCS 5099, Jul. 2008, pp. 236-243.

Bagherian et al., "Facial feature extraction for face recognition: a review", Int. Symp. on Information Technology (ITSIM'2008), Kuala Lumpur, Malaysia, vol. 2, pp. 1-9, Aug. 26, 2008-Aug. 28, 2008.

Fröba et al., "Face Detection with the Modified Census Transform", Proceeding of the Sixth IEEE International Conference on Automatic Face and Gesture Recognition (AFGR'2004), pp. 91-96, May 17, 2004-May 19, 2004.

* cited by examiner

DETECTING AND TRACKING OBJECTS IN DIGITAL IMAGES

FIELD

The invention relates generally to detection of an object in a digital image. Further, the invention relates to tracking the object in a video sequence of digital images.

BACKGROUND

Computer-controlled object detection from digital images and tracking them in a video sequence are extremely challenging tasks. Nevertheless, it has become a very popular research topic due to a wide range of applications available for it. One of the main application areas in the technology field is face recognition or detection, which is widely used, for example, in security systems. Furthermore, it enables interesting features, such as automatic red eye removal, enhancement of the face area resolution, automatic focus of a camera and interpretation of the identity of a person.

However, current solutions for performing face detection include several disadvantages. Typically, in the face detection, a few facial features are extracted from the image and compared to a predetermined feature database. Current face detection technologies apply, for example, simple Haar-wavelet features selected from an integral image constructed from an original grayscale image. Another technique addresses local binary patterns (LBP), where information is obtained by comparing one location of an image (one pixel) to one neighboring pixel. Both of these techniques have disadvantages related to, for example, lack of discriminating facial features leading to poor accuracy, excessive amount of features and data leading to slow processing, poor consideration of a local structure of neighboring pixels, uneven illumination of the face, and varying viewpoint towards the face.

Consequently, a novel solution for performing the object detection and tracking in digital images is needed.

BRIEF DESCRIPTION OF THE INVENTION

An object of the invention is to provide an improved solution for object detection and tracking in digital images.

According to an aspect of the invention, there is provided a method for detecting an object from a digital image constructed of multiple pixels, the method comprising: selecting a neighborhood for each pixel under observation in the image, each neighborhood being of known size and form, and reading pixel values of each neighborhood; selecting at least one set of coefficients for weighting each neighborhood from a whitened matrix such that each pixel value of each neighborhood is weighted with at least one coefficient, the matrix to be whitened being obtained by applying one of the following: the local binary pattern technique, the local phase quantization technique and the modified census transform technique; searching for an existence of at least one object feature at each pixel under observation on the basis of at least one combination of weighted pixel values at each neighborhood; and verifying the existence of the object in the digital image on the basis of the searches of existence of at least one object feature at a predetermined number of pixels.

According to an aspect of the invention, there is provided an apparatus for detecting an object from a digital image constructed of multiple pixels, the apparatus comprising a processor configured to: select a neighborhood for each pixel under observation in the image, each neighborhood being of known size and form, and to read pixel values of each neighborhood; select at least one set of coefficients for weighting each neighborhood from a whitened matrix such that each pixel value of each neighborhood is weighted with at least one coefficient, the matrix to be whitened being obtained by applying one of the following: the local binary pattern technique, the local phase quantization technique and the modified census transform technique; search for an existence of at least one object feature at each pixel under observation on the basis of at least one combination of weighted pixel values at each neighborhood; and verify the existence of the object in the digital image on the basis of the searches of existence of at least one object feature at a predetermined number of pixels.

According to an aspect of the invention, there is provided a computer program product embodied on a non-transitory computer-readable storage medium and comprising program code which, when run on a processor, executes the method according to the present invention.

Embodiments of the invention are defined in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Object detection and tracking is typically processed in apparatuses with high processing capabilities, such as computers. However, nowadays customer requirements for digital cameras and mobile phones are increasing and, thus, it is desired that object detection technology can also be applied in apparatuses with limited processing capabilities, such as mobile phones. The solution for image detection according to the invention may be applied in apparatuses with low processing capabilities.

Figure 1:
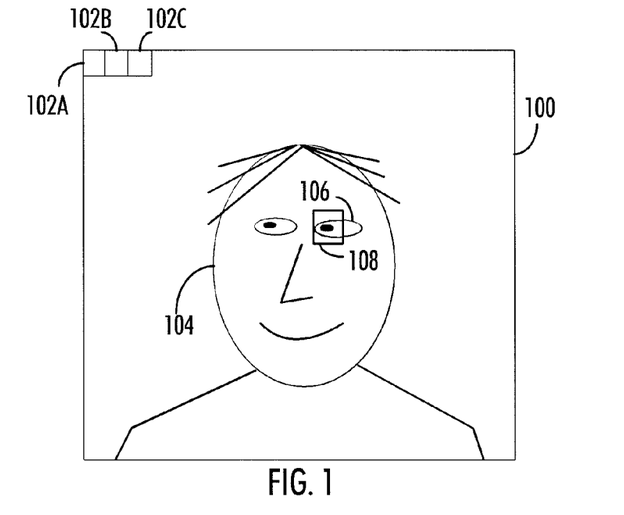
FIG. 1 illustrates an exemplary digital image.

FIG. 1 illustrates a digital image 100. The image may be constructed of multiple pixels 102A to 102C (from now on referred to as 102). The digital image 100 may comprise thousands of pixels 102. For example, the digital image 100 may be constructed of 1920×1080 pixels, as is the case in state-of-the-art high-definition images, where the values refer to the number of the pixels 102 in horizontal and vertical directions, respectively. In other words, the number of pixels 102 in the digital image 100 may determine the resolution of the digital image 100. The higher the number of pixels 102 is, the more accurate resolution the digital image 100 has.

The digital image 100 may further contain an object 104, such as a human face. The object 104 may naturally also be other than the human face. That is, the object 104 may be any object that is visible from the digital image 100. The object 104 may comprise certain object features 106. The object features 106 may be searched for during the object detection. An exemplary object feature 106, in the case where the object 104 being a human face, may be an eye, nose, mouth, ear, hair, space between the eyes, etc. When the object 104 is, for example, a foot, the object feature 106 may be, for example, the length or width of the foot.

In general, the object feature 106 may be any pixel combination that represents the object 104. That is, the object feature 106 may not be any concrete part of the object 104, such as an eye, but the object feature 106 may exist if certain pixels have certain characteristics. These characteristics may be learned prior to the object detection process.

The object feature 106 may be located at a specific location of the digital image 100 or the object 104. For example, if the object feature 106 to be detected is the eye, then the object feature 106 may be surrounding a pixel 108. Thus, the pixel 108 may be an appropriate location to start the search for the object feature 106. Further, an observation area of the object and the resolution of the image may be determined on the basis of the size of the object to be detected.

Figure 2:
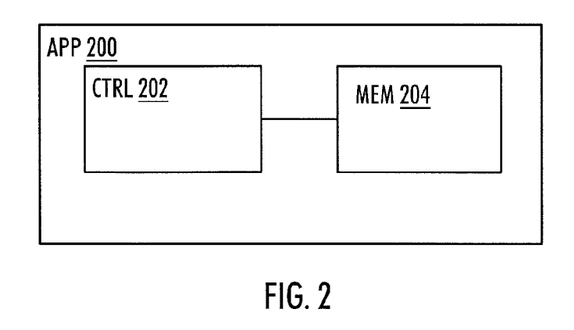
FIG. 2 shows an object detection apparatus according to an embodiment of the invention.

A very general architecture of an object detection apparatus 200 according to an embodiment of the invention is shown in FIG. 2. FIG. 2 only shows the elements and functional entities required for understanding the object detection according to an embodiment of the invention. Other components have been omitted for reasons of simplicity. The implementation of the elements and functional entities may vary from that shown in FIG. 2. The connections shown in FIG. 2 are logical connections, and the actual physical connections may be different. It is apparent to a person skilled in the art that the object detection apparatus 200 may also comprise other functions and structures.

The apparatus 200 for detecting an object from the digital image constructed of multiple pixels may comprise a processor 202. The processor 202 may be implemented with a separate digital signal processor provided with suitable software embedded on a computer readable medium, or with a separate logic circuit, such as an application-specific integrated circuit (ASIC). The processor 202 may comprise an interface, such as a computer port, for providing communication capabilities.

The processor 202 may generate a grayscale image from the digital image. In the grayscale image, the value of each pixel is a single sample representing information about the intensity of the pixel. Grayscale images are composed of multiple shades of gray, varying from black at the weakest intensity to white at the strongest. According to an embodiment of the invention, the object features may be searched directly from the grayscale image without using separate normalization of the variation of the luminance. In prior art solutions, the normalization needs to be done prior to object feature search.

However, according to an embodiment of the invention, the image may not need to be converted into the grayscale prior to the object detection process. The object detection may be performed for a colored digital image as well, or color channels may be combined by some other means to derive one or more different representations of image contents.

Figure 3:
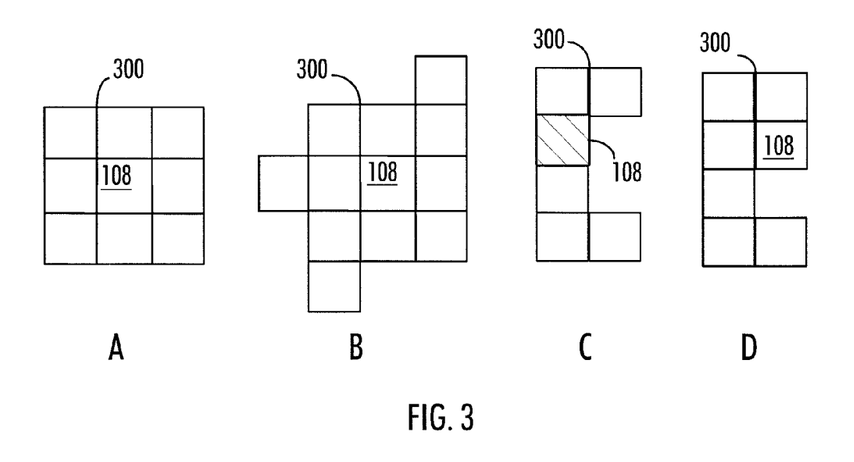
FIG. 3 shows exemplary neighborhood formations.

Referring to FIGS. 2 and 3, the processor 202 may further select a neighborhood 300 for each pixel 108 under observation in the image, each neighborhood 300 being of known size and form. FIG. 3 illustrates different forms of the neighborhood 300. In FIG. 3A, the neighborhood 300 is comprised of nine pixels, that is the pixel 108 under observation has eight neighbors. The neighborhood 300 in FIG. 3A is relatively regular and commonly seen in image processing. However, according to an embodiment of the invention, the neighborhood 300 does not need to be of regular size. That is, the neighborhood 300 may be of arbitrary size and form. This is shown with FIGS. 3B to 3D, in which the neighborhood 300 has many exemplary forms and sizes. Common to all the neighborhoods 300 illustrated in FIGS. 3A to 3D is that they represent a neighborhood for the pixel 108 under observation. The pixel 108 may not need to be comprised in the neighborhood 300, as shown in FIG. 3C with leftwards slanting diagonal lines. In general, the size or the form of the neighborhood 300 is not limited in any way, and it may be selected according to what kind of object feature is searched for. Also, it may be learnt prior to the object detection process.

Each of the pixels in the neighborhood 300 may have one value representing information about the intensity of the pixel. In other words, the pixel value may be comprised of a single sample representing the intensity value of the pixel. That is, the pixel value may a scalar representing the intensity of the pixel. The processor 202 may then read the pixel values of each neighborhood 300. The processor 202 may read the pixel values from a data record or the file of the image. Alternatively, the processor 202 may read the pixel values by visually examining the image provided that the processor 202 is equipped with a sensor capable of visually examining the image.

The processor 202 of the apparatus 200 may further select at least one set of coefficients for weighting each neighborhood such that each pixel value of each neighborhood is weighted with at least one coefficient. That is, the number of pixels in the neighborhood G and the number of coefficients in the set of coefficients $A=[a_1, a_2, \ldots, a_n]$, where n is the amount of pixels in the neighborhood G, may be the same. Similarly, the pixel values of the neighborhood G may be given as $[g_1, g_2, \ldots, g_n]$.

The selection of the at least one set of coefficients may be conducted such that the local structure of the neighborhood is taken into account, not only the size and form of the neighborhood but also the pixel values of the neighborhood. That is, in addition to selecting the size and form of the neighborhood according to the size and form of the feature to be searched for, the coefficient $a_1$ may be selected such that it takes the corresponding $g_1$, and the neighboring pixel values $[g_2, \ldots, g_n]$, into consideration. That is, the coefficients A may be selected such that the set of coefficients A enhances a certain feature. Typically each set of coefficients A indicates a certain shape or a certain frequency band within the neighborhood. The coefficients $[a_1, a_2, \ldots, a_n]$ may look arbitrary, but chosen properly, the combination of $[a_1, a_2, \ldots, a_n]$ can form a powerful descriptor. This way, the processor 202 may affect the locality of the information gathered with the search for the object feature by changing the size and form of the neighborhood 300. An advantage of local information is that it is robust and insensitive to the variations of luminance to the object.

The processor 202 may then search for an existence of at least one object feature at each pixel under observation on the basis of at least one combination of weighted pixel values at each neighborhood. That is, the processor 202 may determine whether a certain object feature, such as an eye, is present in the neighborhood of the pixel under observation. In other words, the object in the image is classified and detected with the aid of the object features found from the neighborhood G of the pixel. Let us discuss in greater detail how the at least one combination may be conducted.

Figure 4A:
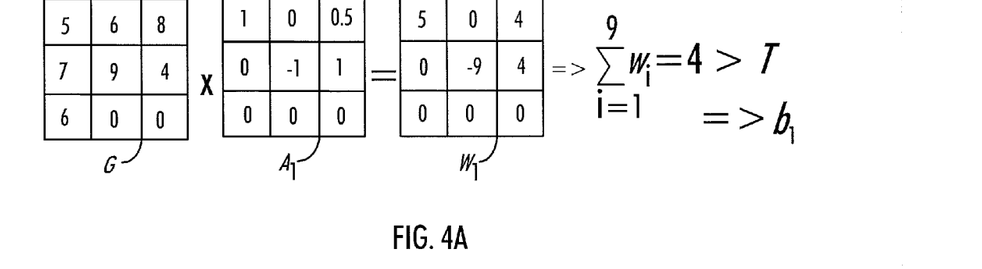
FIG. 4A illustrates a combination of the weighted pixel values, according to an embodiment of the invention.

Let us imagine that the neighborhood G comprises nine pixels in a three times three formation, the first set of coefficients $A_1=[a_{1,1}, a_{1,2}, \ldots a_{1,9}]=[1\ 0\ 0.5\ 0\ -1\ 1\ 0\ 0\ 0]$ and the pixel values for G are given as $[g_1, g_2, \ldots, g_9]=[5\ 6\ 8\ 7\ 9\ 4\ 6\ 0\ 0]$. FIG. 4A illustrates $A_1$, G and how the combination of the weighted pixel values is performed. As can be seen from FIG. 4A, the pixel values of G may be multiplied by $A_1$ in order to obtain the weighted pixel values $W_1=[w_{1,1}, w_{1,2}, \ldots, w_{1,9}]$. Further, the combination of the weighted pixel values $W_1=[w_{1,1}, w_{1,2}, \ldots, w_{1,9}]$ may be a sum of the weighted pixel values $W_1=[w_{1,1}, w_{1,2}, \ldots, w_{1,9}]$. However, the combination of the weighted pixel values $W_1=[w_{1,1}, w_{1,2}, w_{1,9}]$ is not limited to summing, that is to $$\sum_{i=1}^{n} w_{1,i},$$

but the combination may be any arithmetic operation of the weighted pixel values $W_1=[w_{1,1}, w_{1,2}, \ldots, w_{1,9}]$.

According to an embodiment of the invention, the processor 202 of FIG. 2 may determine a first comparison result between a first predetermined threshold T and the combination of the weighted pixel values in order to obtain at least one information bit b for each pixel under observation, the at least one information bit b representing the existence of a specific feature of the object at the pixel under observation, as shown in FIG. 4A. For example, when the result of the combination of the weighted pixel values is higher than the first threshold T, the value for the first information bit $b_1$ may be 1. Similarly, when the result of the combination of the weighted pixel values is lower than the first threshold T, the value for the first information bit $b_1$ may be 0. The first threshold T may represent a threshold for the intensity and it may be determined prior to the object detection process, for example by learning.

Thus, each neighborhood G may provide one information bit for each set of coefficients. Applying multiple sets of coefficients $[A_1, A_2, \ldots, A_m]$ may provide multiple information bits for the same neighborhood, that is a vector B of information bits $[b_1, b_2, \ldots, b_m]$. One set of coefficients may be used in the search for one object feature. Another set of coefficients may be selected to aid in the search for another object feature or in the search of the same object feature under the influence of different environmental characteristics such as luminance.

Figure 4B:
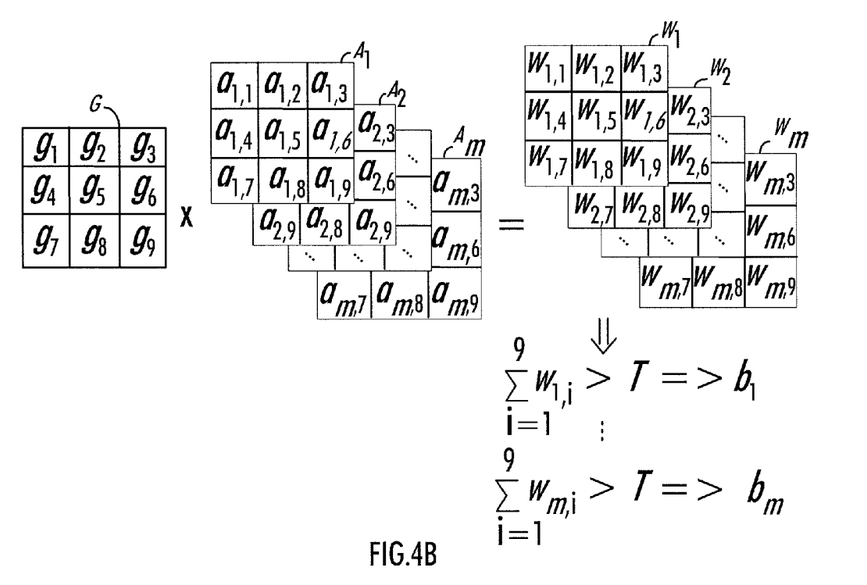
FIG. 4B illustrates a combination of the weighted pixel values, according to an embodiment of the invention.

This is illustrated in FIG. 4B, where the neighborhood G is weighted by multiplying G by multiple sets of coefficients $[A_1, A_2, \ldots, A_m]$ resulting in multiple sets of weighted pixel values $[W_1, W_2, \ldots, W_m]$. Each $A_i$ will be comprised of a three times three matrix including coefficients $[a_{i,1}, a_{i,2}, \ldots, a_{i,9}]$. Similar notations apply to the weighted sets of coefficients $W_i$. Each combination of the sets of weighted coefficients may be compared to the first threshold T. Each comparison result may provide one information bit b representing existence of a specific object feature at the pixel under observation, as shown in FIG. 4B. In other words, the binary representation for the neighborhood and, thus, for the pixel under observation may be provided with multiple binary values. For example, If the number of sets of coefficients is m, then the vector B of information bits equals $[b_1, b_2, \ldots, b_m]$. In other words, m bits of information may be provided for the neighborhood G of the pixel under observation. Thus, if m=8, G may be represented with $2^8=256$ different binary combinations. Each binary combination represents different structures of the neighborhood of the pixel under observation and different object features located in the neighborhood of the pixel under observation.

In general, the values for the sets of coefficients $[A_1, A_2, \ldots, A_m]$ may be selected arbitrarily. This enables a more accurate classification and detection of object features compared to prior art solutions, such as the local binary pattern technique. In the local binary pattern technique, a value for the pixel under observation is compared to all the neighboring pixel values and the comparison results are applied as columns or rows in a matrix to form a matrix representing the neighborhood and comprising a set of coefficients. Consequently, the values for a set of coefficients are limited to only a few possible values and are mainly zeros. Further, since the neighboring pixels typically depend on each other, the resulting sets of coefficients may be highly dependent on each other. As a result, the sets of coefficients may not provide a sufficient amount of information for performing a reliable search of an object feature.

The use of a simple coefficient selection may ease the computational complexity significantly. These kinds of coefficients may be comprised of one +1 coefficient, one −1 coefficient and multiple zeros. The use of complex coefficients comprising any numbers may enable the object features to be more discriminating and, therefore, the detection and classification accuracy of the object to be better than when simple coefficients are used. Further, an appropriate selection of the set of coefficients may enable the information bits B to be independent of each other and/or robust to image blurring.

Thus, according to an embodiment of the invention, in the case of multiple sets of coefficients, the sets of coefficients may be de-correlated. That is, the sets of coefficients may be independent of each other. This way, each one of the sets of coefficients $[A_1, A_2, \ldots, A_m]$ may take the whole neighborhood into account by reducing the number of zero-coefficients in the sets of coefficients. This leads to finding more discriminating object features from the image. In other words, using independent sets of coefficients may enable a more accurate detection of an object with the same number of object features as in prior art solutions or, alternatively, the same detection accuracy of an object with a fewer number of object features as in prior art solutions. For example, the at least one object feature with the least amount of useful information, obtained with the de-correlated (independent) sets of coefficients A, may be discarded from the set of applied object features, thus saving memory capacity and speeding up the object detection process.

In order to obtain independent sets of coefficients $[A_1, A_2, \ldots, A_m]$, the processor 202 may whiten a matrix representing the neighborhood of the pixel in order to obtain de-correlated matrix elements, wherein the matrix is obtained by applying the local binary pattern technique The matrix may be comprised of multiple sets of coefficients $[A_1, A_2, \ldots, A_m]$ applied as the columns or rows in the matrix. As explained earlier, the local binary pattern may produce sets of coefficients, which are dependent of each other and, thus, may not provide a sufficient amount of data for detecting enough discriminating features. By whitening the matrix, the sets of coefficients may be made independent (de-correlated) of each other. Further, after the whitening process, each set of coefficients may take the whole neighborhood into account as explained earlier. Consequently, the processor 202 may select the at least one set of coefficients from the whitened matrix.

The selected at least one set of coefficients may be applied in the object detection process. However, the matrix to be whitened may also be obtained by other means than the local binary pattern technique. For example, the matrix may be learnt prior to the object detection process such that the matrix may enhance a certain object feature(s).

A similar method to the local binary pattern, the modified census transform, compares the pixel values in the neighborhood with the average pixel value of the neighborhood. This results in nine comparison results in the case of a three times three neighborhood. By whitening the matrix of comparison results including the nine bits, the same information may be captured with fewer bits, thus saving capacity.

The processor 202 may whiten the matrix by applying knowledge on the dependency of the pixel values G inside the neighborhood, obtained from specific object images or image models. In other words, the knowledge may be obtained in the learning process prior to the object detection process. The dependency between the pixel values may also be determined for distant pixels, not only to the pixels next to each other. Further, the dependency between the pixel values may be determined for several pixels, not only between two pixels.

Further, the processor 202 may whiten the matrix by applying the Markov model to the matrix. According to the Markov model, the dependency between the pixel values is related to their mutual distances.

After whitening the weight matrix A, the information bits $[b_1, \ldots, b_m]$ obtained may be independent of each other. Thus, the matrix may provide more information about the image after the whitening. Once the processor 202 has obtained information regarding the dependency of the pixel values, it may use the information to whiten the matrix, i.e. to de-correlate resulting features.

Alternatively, the processor 202 may apply the local phase quantization technique in order to obtain the at least one set of coefficients. The local phase quantization utilizes phase information computed locally for every image position. The phases of the low-frequency coefficients are uniformly quantized. According to an embodiment of the invention, these quantized coefficients might be used directly, without a need for computing histograms for such coefficients. The set of coefficients created by using the local phase quantization technique may also be de-correlated in the manners discussed earlier to obtain independent sets of coefficients.

In the detection of an object from a digital image, the image may be processed in multiple sizes until the image is detected. For example, when the original image is comprised of 320 times 240 pixels, the next step may be to decrease the size of the image to 256 times 192 pixels. The at least one object feature may be searched for from multiple pixels with every image size.

Similarly, the image may be processed in parts. The size of a search window may depend, for example, on the size of the object under the search process. For example, while detecting a face from the digital image, the resolution of the search window may be 20 times 20 pixels, whereas a search for a flower may be conducted with a smaller search window, for example five times five pixels. The location of the search window in the digital image may be changed. This way the object may be at any point of the digital image, not only in the center of the digital image, for example.

Figure 5:
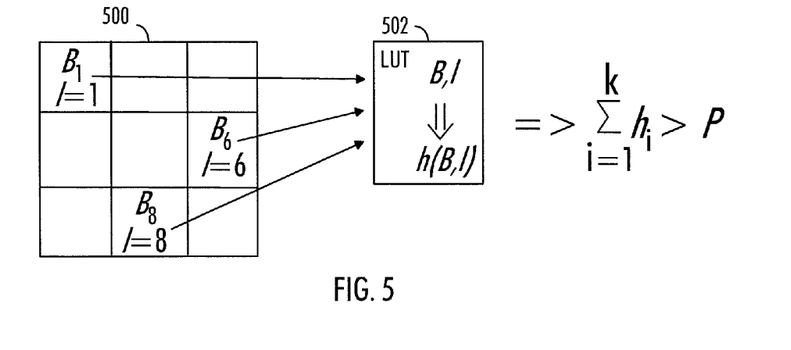
FIG. 5 illustrates a use of a look-up table, according to an embodiment of the invention.

Referring to FIG. 5, for each pixel under observation in the search window 500, the processor 202 of FIG. 2 may determine the location l of the pixel and the vector $B_l$ of the information bits $[b_{l,1}, b_{l,2}, \ldots, b_{l,m}]$ for the pixel surrounded by a neighborhood. In FIG. 5, for example, the pixels at locations l=1, 6 and 8 are under observation and, thus, the vectors $B_1$, $B_6$ and $B_8$ of information bits are computed for them.

A look-up table (LUT) 502 may be used to store conversion coefficients h(B,l) representing the at least one information bit at a specific pixel l. The look-up table 502 may be stored in a memory unit 204 of FIG. 2. The conversion coefficient may be a scalar representing the at least one information bit at a specific location, for example the vector $B_1$ at location l=1, the vector $B_1$ comprising the at least one information bit $[b_{1,1}, b_{1,2}, \ldots, b_{1,m}]$. The conversion coefficient h(B,l) may be used to determine whether an object is in the image or not. The LUT 502 may be learnt prior to the object detection process. That is, the conversion coefficients h(B,l) representing the at least one information bit at a specific pixel l may be learnt.

According to an embodiment of the invention, the processor 202 may further determine a second comparison result between a second predetermined threshold P and a combination of the at least one information bit over all the pixels under observation, the second comparison result representing information regarding existence of the object in the image. The second predetermined threshold P may be determined, for example, by learning prior to the object detection process. The combination of the at least one information bit over all the pixels under observation may be obtained by summing all of the conversion coefficients h(B,l) representing the at least one information bit at a specific pixel l. The processor 202 of FIG. 2 may thus read the conversion coefficients h(B,l) from the look-up table 502 prior to the determination of the combination of the at least one information bit over all the pixels. The processor 202 may further apply the read conversion coefficients h(B,l) in the determination of the combination of the at least one information bit over all the pixels. In FIG. 5, k represents the number of pixels under observation. Since the coefficients h(B,l) represent the at least one information bit at a specific pixel l, it can be deduced that the summing of all of the conversion coefficients h(B,l) represents the combination of the at least one information bit over all the pixels under observation.

However, the combination of the at least one information bit over all the pixels under observation is not limited to the summing of the conversion coefficients h(B,l). In fact, the conversion of the at least one information bit at a specific pixel location/to the conversion coefficient h(B,l) may not be required. Instead, the combination of the at least one information bit over all the pixels under observation may be obtained by directly processing the at least one information bit at each pixel under observation. In general, the combination may be any arithmetic operation of the at least one information bit over all the pixels under observation.

The second comparison result may represent the existence of the object in the image. That is, if the result of the combination of the at least one information bit over all the pixels under observation is higher than the threshold P, then the object under the search process may be present in the image.

However, if the result of the combination of the at least one information bit over all the pixels under observation is lower than the threshold P, then the object under search process may not be present in the image.

However, the process for detecting the object in the digital image may contain performing the second comparison result iteratively with a different number and combination of pixels under observation. For example, if the second comparison result with four pixels under observation leads to in a conclusion that the object is present in the image, the processor 202 of FIG. 2 may select at least one more pixel or a different set of pixels under observation, wherein the different set of pixels may or may not contain any one of the four pixels, and perform the second comparison again. That is, the processor 202 may select a completely new set of pixels comprising a known number of pixels for performing the second comparison again. This way, the existence of the object may be determined with a predetermined number of pixels under observation and reliable results may be obtained.

Further, if the second comparison result with a predetermined number of pixels leads to a conclusion that the object is not in the image, the object detection process may be aborted at an early stage, thus saving computational capacity of the apparatus 200 of FIG. 2. According to an embodiment of the invention, the processor may accept that the object is not in the image when a predetermined number of different second comparisons are not in favor of the existence of the object.

The final acceptance for the presence of the object in the image may be performed after several second comparisons with several search windows have led to a conclusion that the object is in the image. Thus, according to an embodiment of the invention, the processor 202 may accept that the object is in the image when a predetermined number of different second comparisons are in a favor of the existence of the object.

In general, the processor 202 may verify the existence of the object in the digital image on the basis of the searches of the existence of at least one object feature at a predetermined number of pixels. Thus, the processor 202 may detect the object in the digital image. The outcome of the verification, i.e., the detection, may be that the object is in the image or that the object is not in the image. Further, the outcome of the verification may produce additional information, such as the location of the object within the image, the size and orientation of the object, the reliability of the detection, etc.

One set of coefficients $A=[a_1, a_2, \ldots, a_n]$ for detecting a certain object feature may be learnt prior to the object detection. In the learning process, the processor 202 may select a digital image with a known object and determine a set of coefficients $A=[a_1, a_2, \ldots, a_n]$ for weighting each pixel value of the neighborhood G on the basis of the selected image such that after weighting the pixel values $[g_1, g_2, \ldots, g_n]$ of the neighborhood G in the image with the determined set of coefficients $A=[a_1, a_2, \ldots, a_n]$, the combination of the weighted pixel values $[w_1, w_2, \ldots, w_n]$ represents a specific feature of the object in the image. Further, in the case of determining multiple sets of coefficients, the sets of coefficients may be independent of each other.

The learning may be accomplished such that the determination of the set of coefficients is performed for a number of digital images with a known object, and for a number of resolutions of each digital image. For example, the same image containing the same known object may be processed several times with different resolutions and under the influence of different environmental characteristics, such as illumination. This way, a set of coefficients may be determined for different resolutions and for images under the influence of different environmental characteristics. Thus, the appropriate set of coefficients $A=[a_1, a_2, \ldots, a_n]$ for a certain object feature in the digital image may be learnt prior to the object detection process.

Further, in addition to selecting several images with a known object, the learning process may comprise selecting several images without the specific object in the images. Then, the learning process may comprise searching for the sets of coefficients A that may, after weighting the neighborhood pixel values with the sets of coefficients, reveal specific object features, wherein the object features may discriminate the images with the known object from the images without the object. Thus, by teaching the object detection process the discriminating sets of coefficient A, the sets of coefficients may be applied during the object detection process.

Similarly, the first and second thresholds T and P, respectively, may be learnt prior to the object detection. For example, given a specific image with a specific object, the first threshold T may be determined such that when comparing the first threshold T and the combination of the weighted pixel values, the comparison result outputs a reliable result representing the existence of the object feature in the image. Similarly, the determination of the set of coefficients may be conducted such that the determined set of coefficients makes the found object feature more discriminating than without the weighting of the neighborhood pixel values with the set of coefficients.

In general, the well-known learning algorithms, such as the Ada-Boost algorithm, may be applied in determining the most appropriate values for all the parameters that may need to be predetermined.

The processor 202 may further track the object in a sequence of video frames on the basis of a verification of the object at each video frame. This verification might be conducted on the restricted image. Only scales and spatial locations close to the previous detections need to be searched. This makes the tracking faster than the full search. During tracking, the video frame may be divided into smaller windows such that at a specific moment of time, only certain windows are under observation. The window may be processed in order to track the detected object in the frame, for example, twice every second. This enables detection of new objects that might appear in the scene.

After the object has been detected, it may be tracked such that the observation window of a current frame is determined according to the observation window of the previous window. That is, the location where the object was in the previous frame may give advice concerning the location where the object is in the current frame. The observation window may thus be approximately in the same place as in the previous frame. The same applies to the observation window size. Naturally other window sizes and locations may be tested occasionally to ensure reliable detection and tracking of the object.

Figure 6:
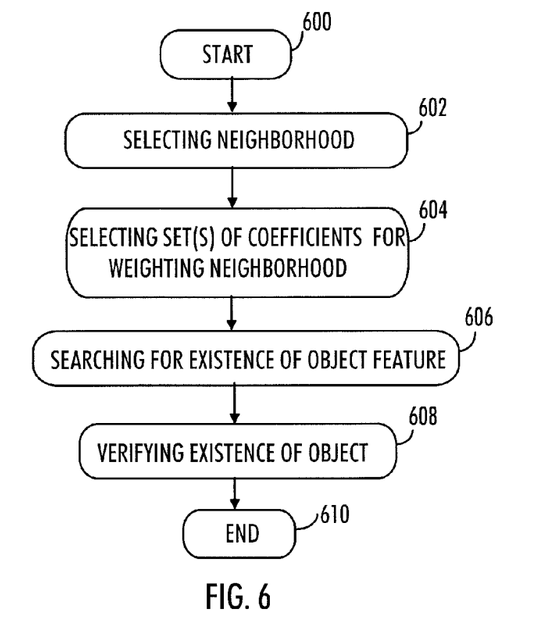
FIG. 6 shows a method for detecting an object from a digital image.

FIG. 6 shows a method for detecting an object from a digital image constructed of multiple pixels. The method begins in step 600.

In step 602, the method comprises selecting a neighborhood for each pixel under observation in the image, each neighborhood being of known size and form, and reading pixel values of each neighborhood. The known size and form of the neighborhood may be learnt prior to the object detection process. Also the size and form of the searched object feature affects the selection of the size and form of the neighborhood.

In step 604, the method comprises selecting at least one set of coefficients for weighting each neighborhood such that each pixel value of each neighborhood is weighted with at least one coefficient. The method may select one set of coefficients per one neighborhood, or it may select multiple sets of coefficients for each neighborhood. The sets of coefficients selected for different neighborhoods may or may not be identical.

Step 606 may comprise searching for existence of at least one object feature at each pixel under observation on the basis of at least one combination of weighted pixel values at each neighborhood. The method may search for a number of object features from different locations in the image. For example, the method may search for one object feature at one location and another object feature at another location or the same object feature at several different locations.

Step 608 of the method comprises verifying the existence of the object in the digital image on the basis of the searches of an existence of at least one object feature at a predetermined number of pixels. Thus, the object may be detected in the digital image. The result of the verification, i.e. the detection, may be that the object is in the image. However, the result may also be that the object is not in the image. Further, the outcome of the verification may produce additional information, such as the location of the object within the image, the size and orientation of the object, the reliability of the detection, etc. The method ends in step 610.

Figure 7:
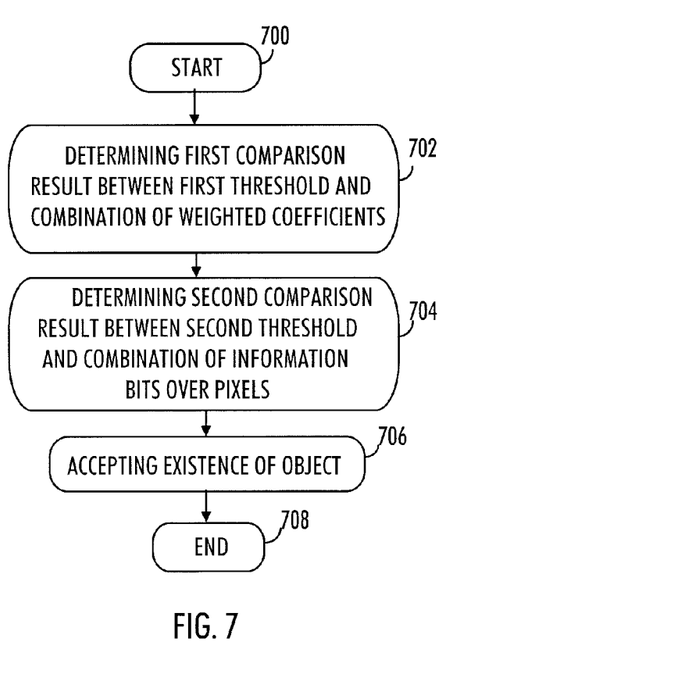
FIG. 7 illustrates a method for accepting the existence of an object in the image.

FIG. 7 illustrates a method for accepting the existence of an object in the image. The method begins in step 700.

Step 702 of the method comprises determining the first comparison result between the first predetermined threshold T and the combination of the weighted pixel values in order to obtain at least one information bit for each pixel under observation, the at least one information bit representing existence of a specific feature of the object at the pixel under observation.

In step 704, the method comprises determining the second comparison result between the second predetermined threshold P and a combination of the at least one information bit over all the pixels under observation, the second comparison result representing information regarding existence of the object in the image.

Step 706 of the method comprises accepting that the object is in the image when a predetermined number of different second comparisons are in favor of the existence of the object. However, the method may conclude that the object is not in the image when a predetermined number of different second comparisons are not in favor of the existence of the object. The method ends in step 708.

The invention offers several advantages. The process for the object detection is fast, enabling real-time tracking. Further, it only requires little processing capacity, which makes it suitable for limited capacity apparatuses such as mobile phones, etc. Moreover, the object features are highly discriminating due to the appropriate choice of the set of coefficients $[A_1, A_2, \ldots, A_m]$.

In addition, the solution provided by the invention does not require a calculation of a histogram for the different object features in the image as is the case in the prior art solutions. This significantly reduces the computation duration, the need for memory capacity, and makes the solution appropriate for limited capacity apparatuses. Further, the solution provided by the invention takes the location of the object in the image into account more efficiently than the prior art solutions.

Embodiments of the invention may be implemented as a computer program in the processor according to the embodiments of the invention. The computer program comprises instructions for executing a computer process for improving the object detection and tracking. The computer program implemented in the processor may carry out, but is not limited to, the tasks related to FIGS. 3 to 7.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method for detecting an object from a digital image constructed of multiple pixels the method comprising:
   selecting a neighborhood for each pixel under observation in the image, each neighborhood being of known size and form, and reading pixel values of each neighborhood;
   selecting at least one set of coefficients for weighting each neighborhood from a whitened matrix such that each pixel value of each neighborhood is weighted with at least one coefficient, the matrix to be whitened being obtained by applying one of the following: the local binary pattern technique, the local phase quantization technique and the modified census transform technique;
   searching for an existence of at least one object feature at each pixel under observation on the basis of at least one combination of weighted pixel values at each neighborhood; and
   verifying the existence of the object in the digital image on the basis of the searches of existence of at least one object feature at a predetermined number of pixels.

2. The method of claim 1, further comprising:
   whitening the matrix by applying knowledge on the dependency of the pixel values in the neighborhood, obtained from specific object images or image models.

3. The method of claim 1, further comprising:
   determining a first comparison result between a first predetermined threshold and the combination of the weighted pixel values in order to obtain at least one information bit for each pixel under observation, the at least one information bit representing an existence of a specific object feature at the pixel under observation;
   determining a second comparison result between a second predetermined threshold and a combination of the at least one information bit over all the pixels under observation, the second comparison result representing information regarding an existence of the object in the image;
   accepting that the object is in the image when a predetermined number of different second comparisons are in favor of the existence of the object.

4. The method of claim 3, further comprising:
   storing conversion coefficients representing the at least one information bit at a specific pixel in a look-up table;
   reading the conversion coefficients from the look-up table prior to the determination of the combination of the at least one information bit over all the pixels; and
   applying the read conversion coefficients in the determination of the combination of the at least one information bit over all the pixels.

5. The method of claim 1, further comprising: tracking the object in a sequence of video frames on the basis of a verification of the object at each video frame.

6. An apparatus for detecting an object from a digital image constructed of multiple pixels, the apparatus comprising a processor configured to:
   select a neighborhood for each pixel under observation in the image, each neighborhood being of known size and form, and to read pixel values of each neighborhood;

select at least one set of coefficients for weighting each neighborhood from a whitened matrix such that each pixel value of each neighborhood is weighted with at least one coefficient, the matrix to be whitened being obtained by applying one of the following: the local binary pattern technique, the local phase quantization technique and the modified census transform technique;

search for an existence of at least one object feature at each pixel under observation on the basis of at least one combination of weighted pixel values at each neighborhood; and verify the existence of the object in the digital image on the basis of the searches of existence of at least one object feature at a predetermined number of pixels.

7. The apparatus of claim 6, wherein the processor is further configured to whiten the matrix by applying knowledge on the dependency of the pixel values in the neighborhood, obtained from specific object images or image models.

8. The apparatus of claim 6, wherein the processor is further configured to:

determine a first comparison result between a first predetermined threshold and the combination of the weighted pixel values in order to obtain at least one information bit for each pixel under observation, the at least one information bit representing an existence of a specific object feature at the pixel under observation;

determine a second comparison result between a second predetermined threshold and a combination of the at least one information bit over all the pixels under observation, the second comparison result representing information regarding an existence of the object in the image;

accept that the object is in the image when a predetermined number of different second comparisons are in favor of the existence of the object.

9. The apparatus of claim 8, wherein the processor is further configured to:

store conversion coefficients representing the at least one information bit at a specific pixel in a look-up table;

read the conversion coefficients from the look-up table prior to the determination of the combination of the at least one information bit over all the pixels; and apply the read conversion coefficients in the determination of the combination of the at least one information bit over all the pixels.

10. The apparatus of claim 6, wherein the processor is further configured to:

track the object in a sequence of video frames on the basis of a verification of the object at each video frame.

11. A computer program product embodied on a non-transitory computer-readable storage medium and comprising program code which, when run on a processor, executes the method according claim 1.

* * * * *